(12) United States Patent
Woszidlo et al.

(10) Patent No.: US 12,241,410 B1
(45) Date of Patent: Mar. 4, 2025

(54) ENGINE NACELLE ANTI-ICE SWIRL SYSTEM WITH UNSTEADY FLUID FLOW

(71) Applicant: The Boeing Company, Arlington, VA (US)

(72) Inventors: Rene Woszidlo, Lawrence, KS (US); John Alexander Ziebart, Bellevue, WA (US); Venkateswara K. Reddy, Bangalore (IN)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/594,975

(22) Filed: Mar. 4, 2024

(51) Int. Cl.
*F02C 7/047* (2006.01)
*F01D 25/02* (2006.01)
*F01D 25/10* (2006.01)

(52) U.S. Cl.
CPC .............. *F02C 7/047* (2013.01); *F01D 25/02* (2013.01); *F01D 25/10* (2013.01); *F05D 2220/323* (2013.01); *F05D 2260/213* (2013.01)

(58) Field of Classification Search
CPC .................................. F02C 7/047; F01D 25/02
See application file for complete search history.

(56) References Cited

U.S. PATENT DOCUMENTS

| | | | | |
|---|---|---|---|---|
| 4,831,819 A | * | 5/1989 | Norris ................... | B64D 15/22 60/39.093 |
| 4,852,343 A | * | 8/1989 | Norris ................... | F02C 7/047 60/779 |
| 9,950,799 B2 | * | 4/2018 | Anderson ............... | F02C 7/047 |
| 10,017,262 B2 | * | 7/2018 | Botura .................... | B64D 15/22 |
| 10,259,589 B2 | * | 4/2019 | Botura .................... | B64D 15/22 |
| 10,513,978 B2 | * | 12/2019 | Tiwari .................... | F02C 7/047 |
| 11,976,592 B1 | * | 5/2024 | Andelson ................ | F02C 7/047 |
| 2015/0030445 A1 | * | 1/2015 | Gonidec ................. | B64D 33/02 137/15.1 |
| 2015/0034767 A1 | * | 2/2015 | Pirat ....................... | F16K 31/12 244/134 B |
| 2017/0057643 A1 | * | 3/2017 | Frank ...................... | B64D 33/02 |
| 2017/0210475 A1 | * | 7/2017 | Wiberg ................... | B64D 29/00 |
| 2018/0290758 A1 | * | 10/2018 | Botura .................... | B64D 15/22 |
| 2020/0032709 A1 | * | 1/2020 | Chilukuri ................ | F02C 7/047 |
| 2020/0122843 A1 | * | 4/2020 | Porte ...................... | B64D 15/04 |
| 2020/0346766 A1 | * | 11/2020 | Lohman ................. | B64D 33/02 |
| 2021/0180514 A1 | * | 6/2021 | Todorovic .............. | F02C 7/047 |

(Continued)

FOREIGN PATENT DOCUMENTS

| | | | | | |
|---|---|---|---|---|---|
| EP | 2918809 A1 | * | 9/2015 | ............. | B05B 1/005 |
| EP | 3623292 A1 | * | 3/2020 | ............. | B64D 15/04 |

(Continued)

*Primary Examiner* — Craig Kim
(74) *Attorney, Agent, or Firm* — Kolitch Romano Dascenzo Gates LLC

(57) ABSTRACT

An anti-ice swirl system for an aircraft engine includes a nacelle including a first nacelle section exposed to ambient environment and facing an oncoming airstream when an aircraft powered by the engine is in flight. The first nacelle section defines a circumferential D-duct. The anti-ice swirl system also includes a nozzle configured to inject into and circulate through the D-duct a controlled unsteady flow of heated fluid. The controlled unsteady flow mixes newly injected heated fluid with air inside the D-duct and mitigates icing of the first nacelle section when the aircraft is in flight.

20 Claims, 4 Drawing Sheets

(56) References Cited

U.S. PATENT DOCUMENTS

| | | | |
|---|---|---|---|
| 2021/0285373 A1* | 9/2021 | Patil | B64D 15/04 |
| 2023/0294833 A1* | 9/2023 | Clarke | G05D 23/1919 |
| | | | 244/134 D |
| 2024/0254894 A1* | 8/2024 | Mallampati | F01D 25/02 |

FOREIGN PATENT DOCUMENTS

| | | | | |
|---|---|---|---|---|
| EP | 3733521 A1 | * | 11/2020 | B64D 15/04 |
| EP | 3733522 A1 | * | 11/2020 | B64D 15/04 |
| EP | 3733523 A1 | * | 11/2020 | B64D 15/04 |

* cited by examiner

ENGINE NACELLE ANTI-ICE SWIRL SYSTEM WITH UNSTEADY FLUID FLOW

INTRODUCTION

The present disclosure relates to an anti-ice swirl system with unsteady fluid flow for an aircraft engine nacelle.

An aircraft engine nacelle or cowling is a streamlined housing mounted to the aircraft's engine. An aircraft engine nacelle is generally used to deliver airflow effectively and with minimum distortion to the fan of the gas turbine and of expanding the gases in the exhaust system with maximum efficiency. An aircraft engine nacelle is designed with an additional objective of protecting the aircraft's gas turbine from external damage. During operation of the aircraft, the leading section of the engine nacelle is generally exposed to oncoming airstream and, depending on ambient conditions, may be susceptible to icing.

SUMMARY

An aircraft engine anti-ice (EAI) swirl system includes a nacelle having a first nacelle section exposed to ambient environment and facing an oncoming airstream when an aircraft powered by the engine is in flight. The first nacelle section defines a circumferential D-duct. The EAI swirl system also includes a nozzle configured to inject into and circulate through the D-duct a controlled unsteady flow of heated fluid. The controlled unsteady flow mixes newly injected heated fluid with air inside the D-duct and mitigates icing of the first nacelle section when the aircraft is in flight.

The icing of the first nacelle section may be minimized at an air inlet of the first nacelle section on an external surface of the D-duct.

The nozzle may be configured to generate a continuous or a pulsating jet of fluid.

The nozzle may have a fixed-component fluidic oscillator structure.

The controlled unsteady flow of the heated fluid may mix the heated fluid with colder air proximate and along an inner surface of the D-duct. Such mixing of the heated fluid with colder boundary air is intended to enhance heat transfer from the heated fluid to the inner surface of the D-duct and counter origination of hot and cold spots inside the D-duct.

The hot spot(s) may be countered downstream of the nozzle and the cold spot(s) may be countered upstream of the nozzle inside the D-duct.

The aircraft engine may include a power-generating assembly configured to generate the heated fluid. The EAI swirl system may also include a second nacelle section configured to house the power-generating assembly.

The controlled unsteady flow of the heated fluid injected by the nozzle may facilitate limiting bleed of the heated fluid from the power-generating assembly and thereby enhance generation of thrust by the aircraft engine. The reduction of the heated fluid bleed may also reduce the amount of hot air injected into the D-duct to alleviate overheating of structural elements in the first nacelle section.

The EAI swirl system may additionally include at least one exhaust slot arranged on the first nacelle section and fluidly connecting the D-duct to the ambient environment to expel at least a portion of the heated fluid from the D-duct to the ambient environment.

The exhaust slot(s) may be arranged at least 180 degrees downstream of the nozzle.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
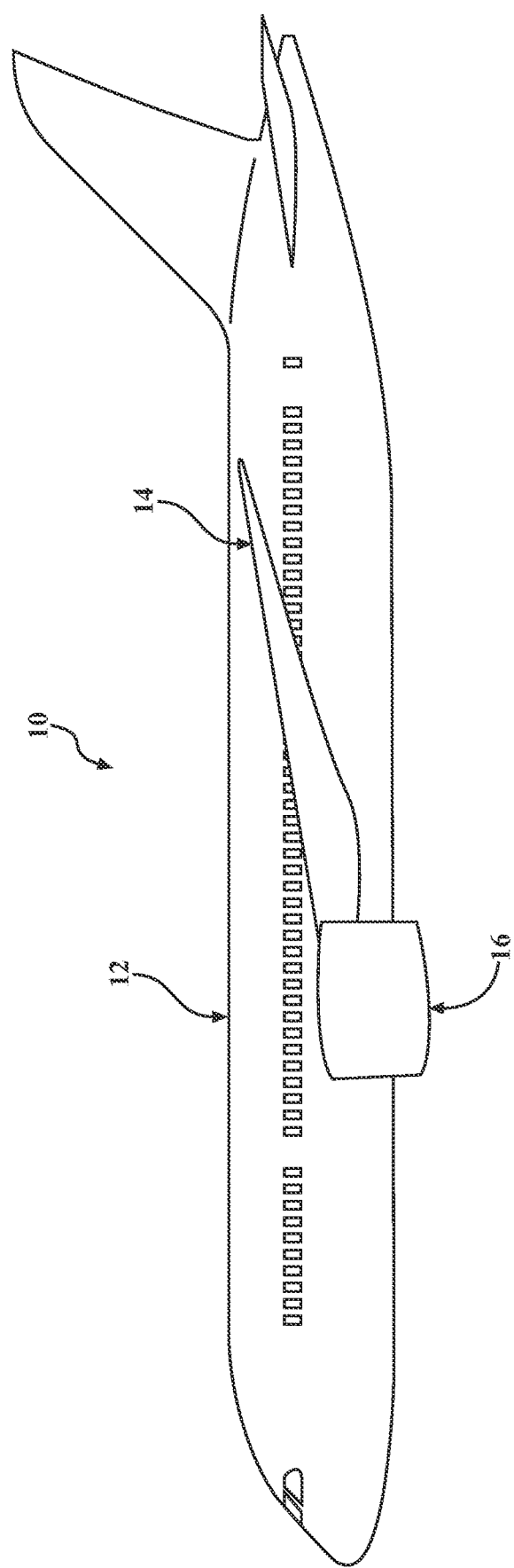
FIG. 1 is a schematic side view of an aircraft having an engine housed in a nacelle, according to the present disclosure.

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Referring to the drawings, wherein like reference numbers refer to like components, FIG. 1 shows an embodiment of an aircraft 10 having a fuselage 12 and wings 14 attached thereto. The aircraft 10 also has one or more engines 16. Each engine 16 may be arranged on and mounted to the fuselage 12 or to the respective wing 14 (as shown).

Figure 2:
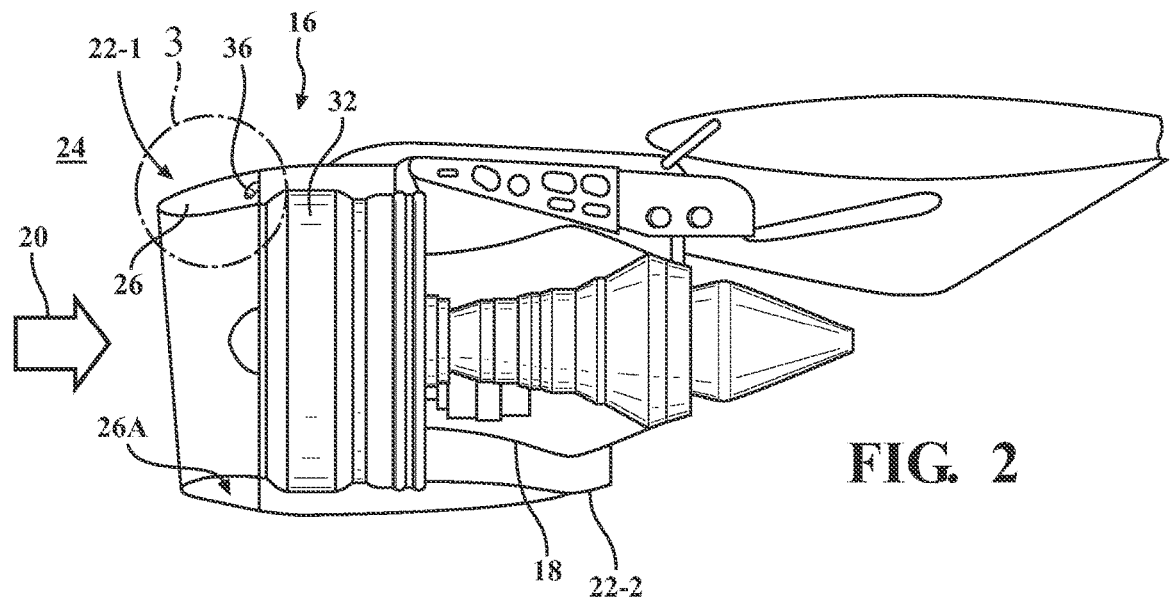
FIG. 2 is a schematic close-up cross-sectional view of the engine shown in FIG. 1, depicting a power-generating assembly housed within the nacelle, according to the disclosure.

As shown in FIG. 2, each engine 16 includes a power- or thrust-generating assembly 18, such as a gas turbine assembly, configured to power the aircraft 10 for flight. When the aircraft is in flight, an oncoming airstream 20 enters the power-generating assembly 18 for combustion of aviation fuel therein. The engine 16 also includes a substantially circular, in a cross-sectional view, aircraft engine nacelle 22 configured to house the power-generating assembly 18. The nacelle 22 includes a first or leading nacelle section 22-1 exposed to ambient environment 24 and facing the oncoming airstream 20 when the aircraft 10 is powered by the engine 16 through the air and is in flight. The first nacelle section 22-1 is arranged generally ahead of the power-generating assembly 18 and provides an air inlet for subsequent combustion of fuel.

The engine nacelle 22 also includes a second or trailing nacelle section 22-2 arranged axially behind the first nacelle section 22-1. The second nacelle section 22-2 is generally configured to surround and cover the power-generating assembly 18 and an exhaust outlet portion thereof. Each of the first and second nacelle sections 22-1, 22-2 may be constructed from a thermal energy insulating and impact resistant material, such as metal. Specifically, the first and second nacelle sections 22-1, 22-2 may be constructed from metal, such as aluminum. Alternatively, to reduce the mass of engine 16, the second nacelle section 22-2 may be constructed from a lighter rigid material, such as a composite.

Figure 3:
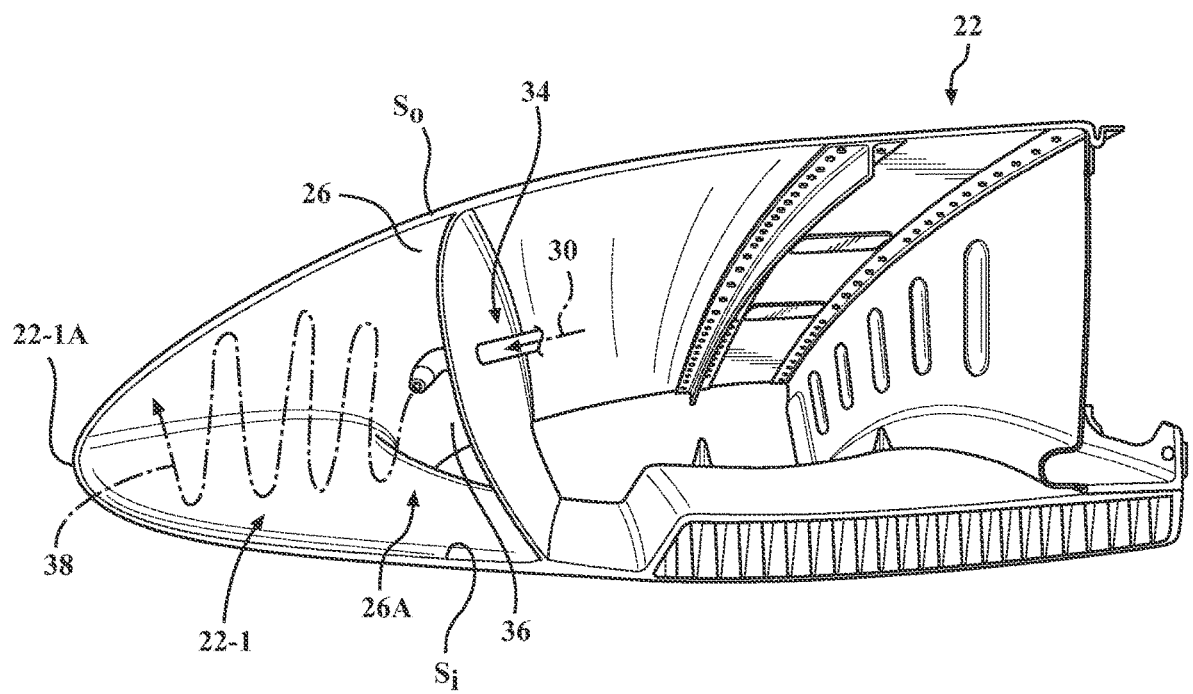
FIG. 3 is a schematic enlarged detailed view of the nacelle portion shown in circle 3 of FIG. 2, depicting an engine anti-ice (EAI) swirl system arranged inside a D-duct and employing a nozzle supplying controlled unsteady flow of heated gas into the D-duct, according to the disclosure.

An enlarged detailed view of the first nacelle section 22-1 structure identified by circle 3 in FIG. 2 is shown in FIG. 3. During flight of the aircraft 10 at higher altitudes, it is common for the first nacelle section 22-1, specifically at the leading edge 22-1A (shown in FIG. 3) of nacelle air inlet, to experience formation of ice. Such ice formation may be detrimental to durability of the power-generating assembly 18, particularly in the event the formed ice is ingested by the engine 16. To mitigate icing of the first nacelle section 22-1 during flight, aircraft 10 generally includes an engine anti-ice (EAI) swirl system. The EAI swirl system includes a circumferential D-duct 26 defined by the first nacelle section 22-1. The D-duct 26 is configured to accept and circulate therethrough a heated fluid 30. Heated fluid 30 is typically a gas drawn from the power-generating assembly 18. The subject gas may be channeled into the D-duct 26 from one of the stages of the power-generating assembly 18 downstream of nacelle 22 air inlet and upstream of the engine's exhaust outlet.

Generally, drawing bleed air from the power-generating assembly 18 introduces a performance penalty on the engine 16. For example, drawing bleed air may cause reduced engine thrust generation, higher fuel consumption, increase in turbine temperatures, and overall impact on aircraft performance. On the other hand, accumulation of ice on the first nacelle section 22-1 increases the risk of inlet airflow separation during aircraft's high angle of attack maneuvers, which may result in increased structural fatigue of an engine fan blade (identified in FIG. 2 via numeral 32). Accordingly, an effective EAI swirl system requiring a reduced amount of gas bled from the power-generating assembly 18 is highly beneficial.

As shown in FIGS. 2 and 3, the D-duct 26 is defined by a generally circular internal space 26A bounded by a lip skin or outer surface $S_o$ and an inner wall surface $S_i$ of the first nacelle section 22-1. As the colder oncoming airstream 20 impinges on the first nacelle section 22-1, the outer surface $S_o$ is continuously cooled. On the other hand, temperature of the heated fluid 30 supplied to the D-duct 26 from the power-generating assembly 18 may be around 1,000 degrees Fahrenheit. If the heated fluid 30 is introduced via a standard, steady jet nozzle (not shown), the flow of the subject fluid introduces thermal energy into the D-duct 26 primarily along the linear fluid path.

In an EAI system using a steady jet nozzle, because of the steady jet's path linearity, heated fluid 30 typically contacts the inner surface $S_i$ of the generally circular internal space 26A in discrete location(s), locally heating the first nacelle section 22-1. Accordingly, in the EAI swirl system embodiment employing such a steady jet nozzle may result in an uneven temperature distribution inside the D-duct 26. In fact, such an arrangement may promote origination of hot spots 26-1 and cold spots 26-2 or areas (shown in FIG. 4) on the nacelle wall surface of the D-duct 26. The hot spots 26-1 may be generated where the heated fluid 30 directly contacts the inner surface $S_i$ and cold spots or areas 26-2 may develop where a path traversed by the heated fluid through the D-duct is relatively distant from the inner surface and farther downstream from the steady jet nozzle.

With resumed reference to FIGS. 2 and 3, the present EAI swirl system 34 specifically employs a distinct nozzle 36. The nozzle 36 is configured to inject the heated fluid 30 into the D-duct 26 in a controlled unsteady flow 38 (shown in FIG. 3). The controlled unsteady flow 38 is specifically configured to generate a substantially uniform temperature distribution inside the D-duct 26 and thereby mitigate icing of the D-duct. The term controlled unsteady flow herein denotes a stream of fluid whose path trajectory and/or flow rate is continuously regulated or altered via its source in a generally predictable manner. Specifically, the stream of heated fluid 30 is controlled relative to the internal space 26A to alter the stream's path trajectory and/or flow rate regularly or continuously via the nozzle 36 to generate the unsteady flow 38.

The controlled unsteady flow 38 exhibits local fluctuations in the heated fluid stream, which yields increased swirl ratio (D-duct sectional flow rate to inlet flow rate) and higher heat flux due to stronger gradients compared to steady fluid flow. The unsteady flow 38 is intended to oscillate and mix newly injected heated fluid 30 with the colder, slower moving or stagnant air near the inner surface $S_i$ of the first nacelle section 22-1, thereby generating a more uniform temperature distribution inside the D-duct 26. The nozzle 36 is oriented to inject the controlled unsteady flow 38 of heated fluid into the D-duct 26 in a particular direction, such as clockwise or counterclockwise, and circulate the fluid therethrough.

Figure 5A:
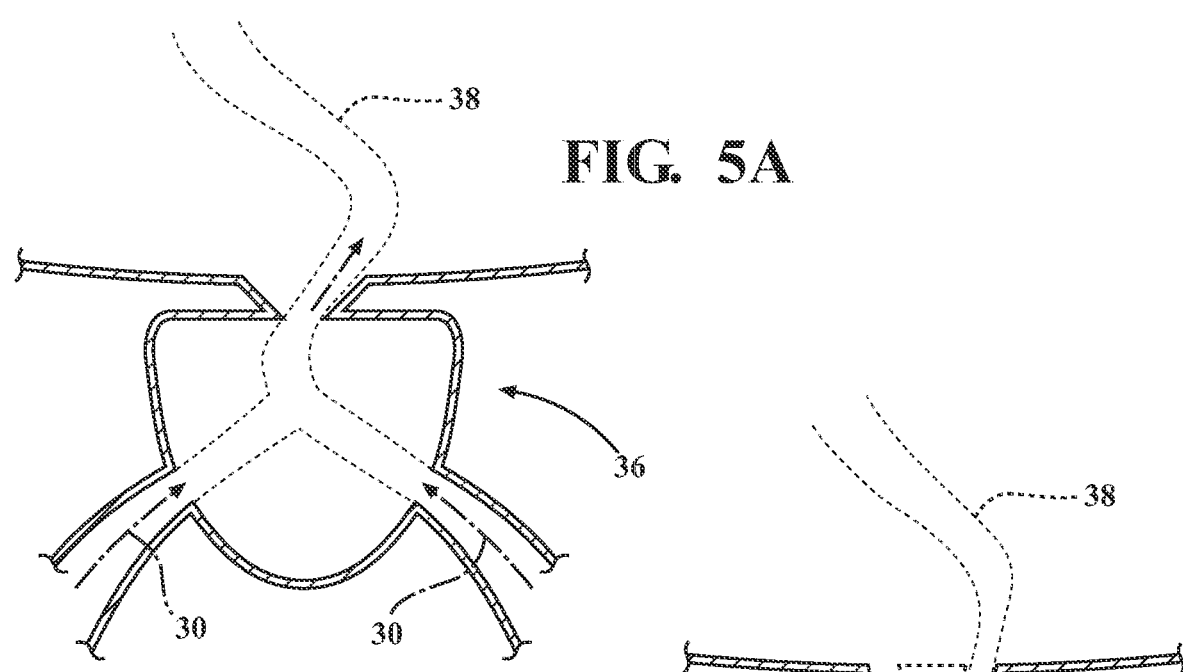
FIG. 5A is a schematic cross-sectional view of a representative embodiment of a fluidic oscillator for use in the nozzle shown in FIG. 3.
Figure 5B:
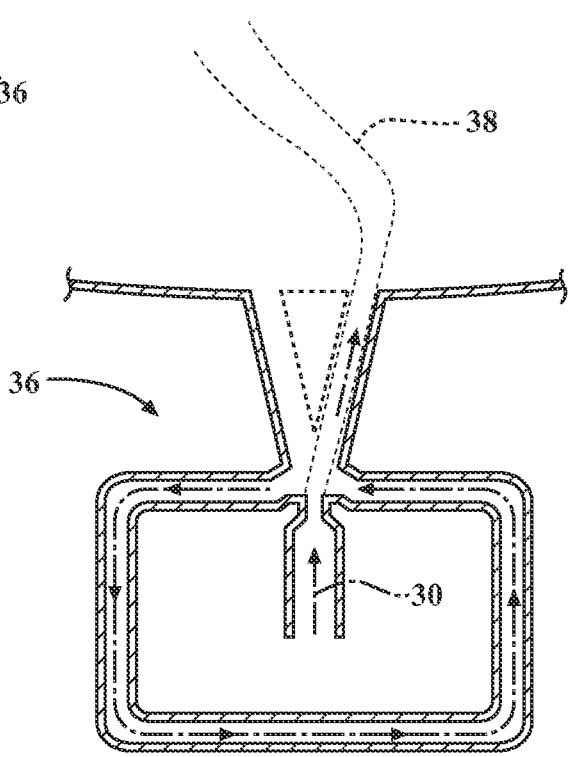
FIG. 5B is a schematic cross-sectional view of another representative embodiment of a fluidic oscillator for use in the nozzle shown in FIG. 3.
Figure 5C:
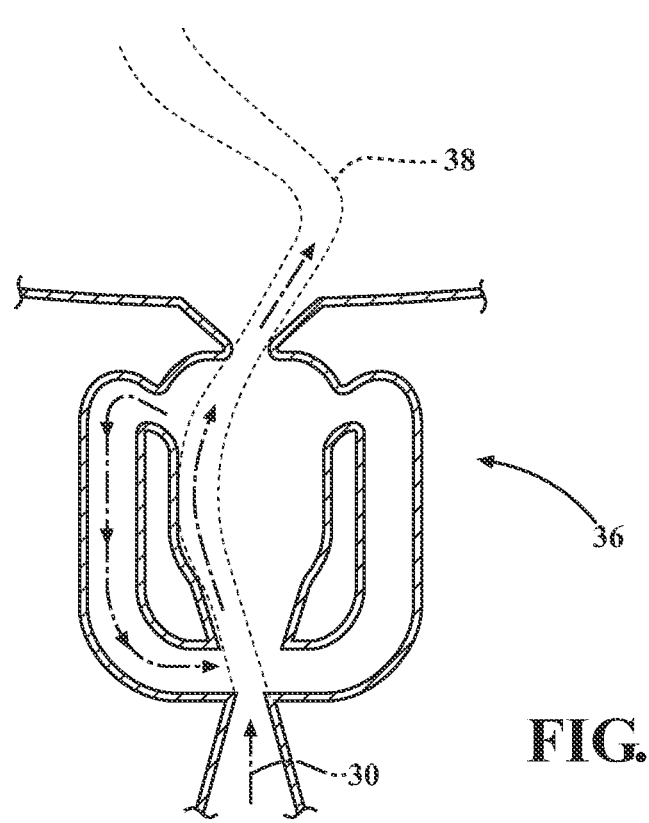
FIG. 5C is a schematic cross-sectional view of another representative embodiment of a fluidic oscillator for use in the nozzle shown in FIG. 3.

The nozzle 36 may be a fluidic oscillator having a fixed or stationary component structure, i.e., the subject nozzle may be devoid of moving parts. Such a nozzle 36 may, for example, be a cavity-jet fluidic oscillator, a feedback-free fluidic oscillator, or be configured with feedback channel(s). The nozzle 36 may also be configured to generate either a continuous or a pulsating jet of the heated fluid 30. A pulsating jet may further facilitate mixing of the heated fluid 30 drawn from the power-generating assembly 18 with the colder air present inside the D-duct 26. Cross-sections of representative fluidic oscillators are depicted in FIGS. 5A-5C. Alternatively, the nozzle 36 may be a fluidic oscillator using active valves, moving flaperons, etc. (not shown) to generate the unsteady flow 38.

The enhanced effectiveness of controlled unsteady flow 38 of the heated fluid 30 generated by the nozzle 36 in maintaining ice accumulation on the first nacelle section 22-1 below acceptable level may permit employing a reduced amount of heated fluid. In other words, a smaller volume of gas may be bled from the power-generating assembly 18 to generate acceptable de-icing of the first nacelle section 22-1. For example, in similar engine applications, the controlled unsteady flow 38 of heated fluid via the nozzle 36 may simultaneously improve de-icing performance and reduce engine gas bleed requirements by up to 50% relative to an EAI swirl system using a steady jet flow nozzle. As a result, employing the nozzle 36 in the EAI swirl system 34 may preserve operating efficiency of the power-generating assembly 18 and enhance the aircraft engine's ability to generate thrust. Additionally, the reduction of the heated fluid bleed may also reduce the amount of hot air injected into the D-duct 26 to alleviate overheating of local structural elements in the first nacelle section 22-1.

The nozzle 36 may be particularly configured to control the unsteady flow 38 such that the central flow of the heated fluid 30 is mixed with the air proximate to and along the inner surface $S_i$ of the D-duct, i.e., boundary air. Such mixing of the heated fluid 30 with the colder boundary air along the inner surface $S_i$ promotes a substantially uniform temperature distribution inside the D-duct to minimize the likelihood of icing thereon. The mixing of the heated fluid 30 and air inside the D-duct 26 also results in enhanced heat transfer from the heated fluid to the wall of the D-duct 26. Specifically, the mixing of heated fluid 30 with colder boundary air would spread the thermal energy of the heated fluid across a wider portion of the D-duct's inner surface $S_i$ and counter origination of hot and cold spots 26-1, 26-2.

Figure 4:
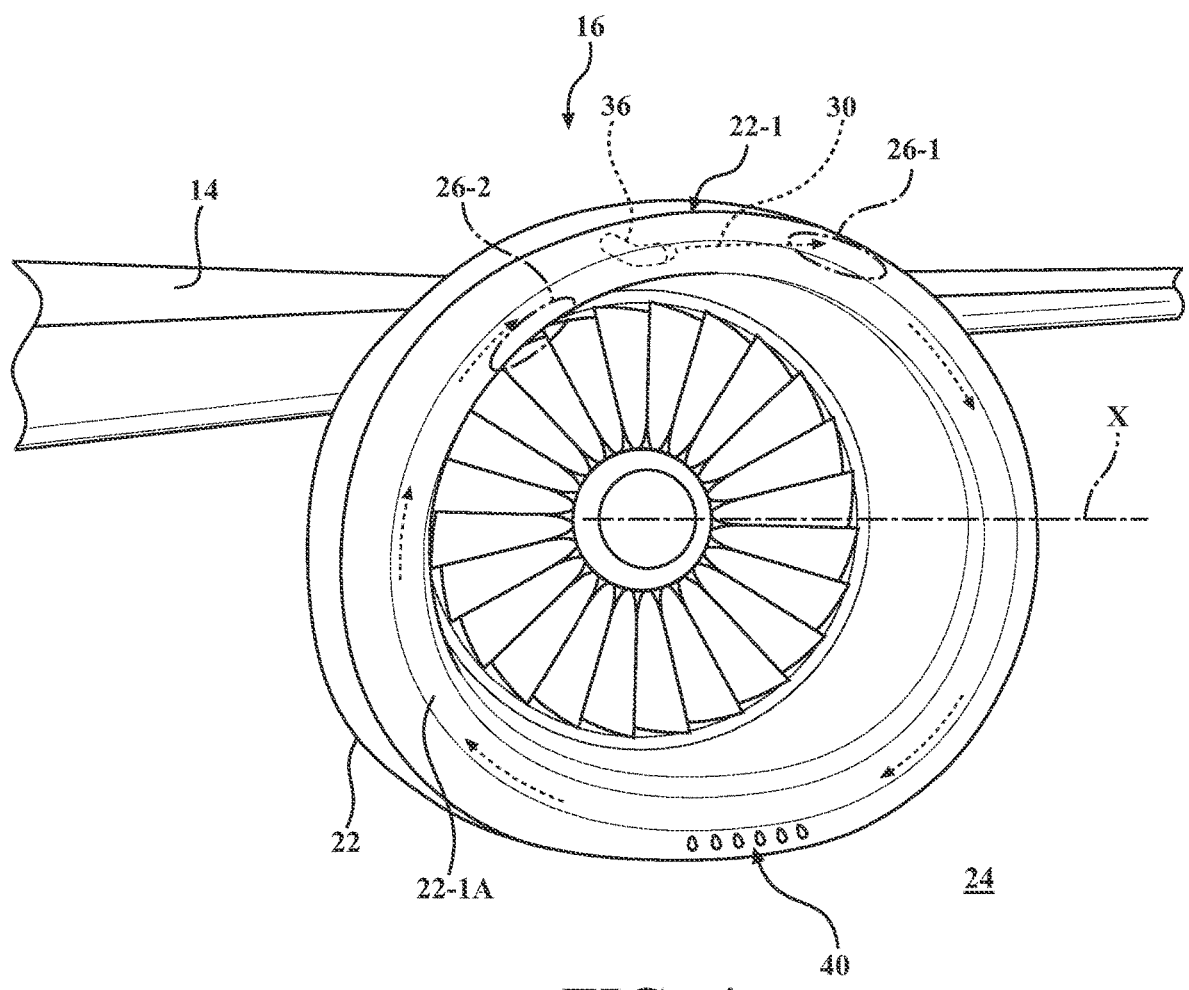
FIG. 4 is a schematic perspective view of the engine nacelle shown in FIG. 2, depicting hot and cold spots generated on the D-duct shown in FIG. 3 and a grouping of exhaust slots arranged on a leading section of the nacelle, according to the disclosure.

Generally, as shown in FIG. 4, a hot spot 26-1 may develop 30-45 degrees downstream of a steady jet flow nozzle following prolonged operation of the EAI swirl system 34. Other areas in the D-Duct 26 may also experience hot spots 26-1. The nozzle 36 may be effective in countering generation of such hot spots 26-1 inside the D-duct 26. On the other hand, the cold spot 26-2 may generally develop just upstream of an originating steady jet flow EAI nozzle, such as within 45 degrees of the subject nozzle. The nozzle 36 may be equally effective in countering generation of cold spot(s) 26-2. As a result, the nozzle 36 of the EAI swirl system 34 de-ices the first nacelle section 22-1 during aircraft flight while maintaining structural integrity of the engine nacelle more effectively than an EAI system using a steady jet nozzle.

As additionally shown in FIG. 4, the first nacelle section 22-1 may also include a plurality of exhaust slots 40 fluidly connecting the D-duct 26 to the ambient environment 24. As shown, the exhaust slots 40 extend from the inner surface $S_i$ to the outer surface $S_o$ and are generally positioned on the bottom or underside portion of the first nacelle section 22-1, i.e., below a centerline X of the nacelle 22. Such positioning of the exhaust slots 40 is intended to minimize the likelihood of exhaust slots catching airborne moisture during particular maneuvers of the aircraft 10. The exhaust slots 40 may be arranged to expel at least a portion of the heated fluid 30 from the D-duct 26 and mitigate build-up of heat inside the D-duct.

As illustrated in FIG. 4, the exhaust slots 40 may be grouped together and arranged 180 degrees or more downstream of the nozzle 36, i.e., in the general direction of the unsteady flow 38, thus permitting the heated fluid 30 to traverse at least half of the D-duct 26 before being vented to the atmosphere. In the swirl system 34, the number and/or sizing of the exhaust slots 40, as well as their positioning (?), may be altered in comparison with an EAI swirl system employing a steady jet flow nozzle. For example, the number and/or sizing of the exhaust slots 40 may be decreased in proportion to the reduction in the volume of heated fluid 30 injected into the D-duct 26.

In summary, the present EAI swirl system employs the nozzle 36 to generate a controlled unsteady flow of heated fluid within the D-duct of the engine nacelle. The controlled unsteady flow generates a more uniform temperature distribution inside the D-duct by mixing the jet of heated fluid with the air inside the D-duct, such as boundary air along the nacelle wall, to minimize the likelihood of icing of the nacelle inlet when the aircraft is in flight. Additionally, the unsteady flow of heated fluid controlled by the subject nozzle enhances heat transfer from the heated fluid to the inner wall surface of the nacelle and counters origination of hot and cold spots inside the D-duct. The nozzle 36 may particularly employ a fixed-component fluidic oscillator structure to generate the requisite unsteady flow of heated fluid without relying on moving parts.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An engine anti-ice (EAI) swirl system for an aircraft engine, the EAI swirl system comprising:
   a nacelle including a first nacelle section exposed to ambient environment and facing an oncoming airstream when an aircraft powered by the engine is in flight, wherein the first nacelle section defines a circumferential D-duct; and
   a nozzle configured to generate a pulsating jet of heated fluid and inject into and circulate through the D-duct an unsteady flow of the heated fluid, wherein the unsteady flow mixes the heated fluid within the D-duct to generate a uniform temperature distribution to counter origination of hot and cold spots within the D-duct and minimize likelihood of icing of the first nacelle section when the aircraft is in flight.

2. The EAI swirl system of claim 1, wherein the nozzle has a fixed-component fluidic oscillator structure.

3. The EAI swirl system of claim 2, wherein the nozzle includes one or more feedback channels.

4. The EAI swirl system of claim 1, wherein the nozzle is configured to control the unsteady flow of heated fluid to thereby mix fluid flow along a center of the D-duct and fluid flow proximate and along a wall of the D-duct to enhance heat transfer from a fluid flow path along the center of the D-duct to a fluid flow path along the wall.

5. The EAI swirl system of claim 1, wherein the aircraft engine includes a power-generating assembly configured to generate the heated fluid, and wherein the EAI swirl system further comprises a second nacelle section configured to house the power-generating assembly.

6. The EAI swirl system of claim 5, wherein the unsteady flow of the heated fluid injected by the nozzle facilitates limiting bleed of heated fluid from the power-generating assembly and thereby enhances thrust generation of the aircraft engine.

7. The EAI swirl system of claim 1, further comprising at least one exhaust slot arranged on the first nacelle section and fluidly connecting the D-duct to the ambient environment to expel at least a portion of the heated fluid from the D-duct to the ambient environment.

8. The EAI swirl system of claim 7, wherein at least one exhaust slot is arranged at least 180 degrees upstream of the nozzle.

9. The EAI swirl system of claim 1, wherein the hot spot is countered downstream of the nozzle and the cold spot is countered upstream of the nozzle within the D-duct.

10. The EAI swirl system of claim 1, wherein the icing of the first nacelle section is minimized at an air inlet of the first nacelle section on an external surface of the D-duct.

11. An aircraft engine comprising:
    a power-generating assembly configured to power an aircraft and generate a heated fluid;

a nacelle including:
a first nacelle section exposed to ambient environment, facing an oncoming airstream when the aircraft is powered by the engine and is in flight, and defining a circumferential D-duct;
a second nacelle section configured to surround and cover the power-generating assembly; and
a nozzle arranged inside the first nacelle section and configured to generate a pulsating jet of heated fluid and inject into and circulate through the D-duct an unsteady flow of the heated fluid, wherein the unsteady flow mixes the heated fluid within the D-duct to generate a uniform temperature distribution to counter origination of hot and cold spots within the D-duct and minimize likelihood of icing of the first nacelle section when the aircraft is in flight.

12. The aircraft engine of claim 11, wherein the nozzle has a fixed-component fluidic oscillator structure.

13. The aircraft engine of claim 12, wherein the nozzle includes one or more feedback channels.

14. The aircraft engine of claim 11, wherein the nozzle is configured to control the unsteady flow of heated fluid to thereby mix fluid flow along a center of the D-duct and fluid flow proximate and along a wall of the D-duct to enhance heat transfer from a fluid flow path along the center of the D-duct to a fluid flow path along the wall.

15. The aircraft engine of claim 11, wherein the unsteady flow of the heated fluid injected by the nozzle facilitates limiting bleed of heated fluid from the power-generating assembly and thereby enhances thrust generation of the aircraft engine.

16. The aircraft engine of claim 11, further comprising at least one exhaust slot arranged on the first nacelle section and fluidly connecting the D-duct to the ambient environment to expel at least a portion of the heated fluid from the D-duct to the ambient environment.

17. The aircraft engine of claim 16, wherein at the least one exhaust slot is arranged at least 180 degrees upstream of the nozzle.

18. The aircraft engine of claim 11, wherein the hot spot is countered downstream of the nozzle and the cold spot is countered upstream of the nozzle within the D-duct.

19. The aircraft engine of claim 11, wherein the icing of the first nacelle section is minimized at an air inlet of the first nacelle section on an external surface of the D-duct.

20. An engine anti-ice (EAI) swirl system for an aircraft engine, the EAI swirl system comprising:
a nacelle including a first nacelle section exposed to ambient environment and facing an oncoming airstream when an aircraft is powered by the engine through the air and is in flight, wherein the first nacelle section defines a circumferential D-duct; and
a nozzle having a fixed-component fluidic oscillator structure configured to generate a pulsating jet of heated fluid and inject into and circulate through the D-duct an unsteady flow of the heated fluid;
wherein:
the unsteady flow mixes the heated fluid within the D-duct to generate a uniform temperature distribution to counter origination of hot and cold spots within the D-duct and minimize likelihood of icing of the first nacelle section when the aircraft is in flight;
the nozzle is configured to control the unsteady flow of heated fluid to thereby mix fluid flow along a center of the D-duct and fluid flow proximate and along a wall of the D-duct to enhance heat transfer from a fluid flow path along the center of the D-duct to a fluid flow path along the wall.

\* \* \* \* \*